UNITED STATES PATENT OFFICE 2,316,146

CASEIN PLASTICS

Frederick W. Adams, Pittsburgh, Pa., and William H. Lycan, Milwaukee, Wis., assignors to Pittsburgh Plate Glass Company, a corporation of Pennsylvania No Drawing. Application March 22, 1940,
Serial No. 325,376

8 Claims. (Cl. 106—147)

The present invention relates to plastic compositions and it has particular relation to such compositions as comprise casein as their primary or principal ingredient.

One object of the invention is to provide a plastic composition from casein, or casein-like material, which is homogeneous and relatively flexible and strong even under conditions of relatively low atmospheric humidity.

This and other objects of the invention will be apparent from consideration of the following specification and the appended claims.

Casein and similar proteins have been widely used in the plastics industry for many years. Molded or extruded in the form of rods, sheets or tubes, a variety of manufactured articles, such as buttons, advertising novelties, and the like have been formed by shaping or stamping. In solution, it has been widely used as an adhesive in the manufacture of furniture, plywood, safety glass and other products. Casein is also widely used in the paper industry in the preparation of coated or enameled papers.

The use of casein as a binder for paint is quite old although until recent years its use has been limited in this country. Improvements in quality have led to increased use and both casein solution and powder paints are now important articles of commerce.

More recent developments include the production of films or transparent paper and protein textile fibers. Films are formed by a variety of means: by feeding powder to the inner face of a band that passes around a molding cylinder, by casting a casein solution and by extrusion of very thin sheets. In the production of artificial fibers, casein solutions are extruded into a coagulating bath and the resultant fibers are "tanned" with formaldehyde.

The most serious weakness of casein plastic material derives from the readiness with which casein absorbs and releases water. The material not only absorbs water when soaked, but it also "breathes" with changes in relative humidity of the surrounding air. Absorption of large amounts of water causes softening and swelling; drying causes hardening and contraction which weakens the material and causes fracture. This tendency although greatly reduced by the hardening or "tanning" action of formaldehyde or other aldehydes has eliminated casein plastics from consideration for certain uses and has seriously restricted it in others.

Perhaps the most serious aspect of the behavior of casein plastics toward water vapor is that of drying out at low relative humidity and becoming brittle.

It has now been found that this tendency can be greatly decreased by incorporating in the casein plastic during the usual methods of fabrication, suitable proportions of esters of glycol, glycerol or other polyhydroxy compounds and levulinic acid. Partially or completely esterified derivatives may be used. Thus, diethylene glycol mono- and dilevulinates may be used almost interchangeably for the purpose. Other compounds which may be mentioned by way of example are: glycol dilevulinate, triethylene glycol mono- and dilevulinates, trimethylene glycol mono- and dilevulinates, glyceryl mono-, di- and trilevulinates and the like.

Any of the aforesaid products or their equivalents may be incorporated in casein solutions either alone or in the presence of other modifying agents, softeners, pigments, fillers, preservatives and the like. Being generally soluble in water, they are readily distributed throughout the mass by simple mixing. Alternatively they may be milled or mixed with casein powder in the presence of a limited amount of water. Useful articles which may be hardened by after treatment with formaldehyde or other "tanning" agents may be fabricated from the casein so prepared by any of the usual processes for the purpose.

The fabricated articles are characterized by improved resistance to the effects of exposure at low relative humidity. The improvement is particularly apparent in unsupported articles such as sheets, films and molded articles which rely on the casein alone for structural strength.

The following examples will serve to clarify further the nature of the invention:

*Example 1.*—An aqueous solution is prepared by soaking 50 parts of casein in 250 parts of water until the protein is thoroughly wet throughout and then adding sufficient alkali to dissolve the casein. Caustic soda may be used for the purpose or, if desired, caustic potash, sodium carbonate, ammonia, borax or other mildly alkaline salts or triethanol amine or other organic bases are satisfactory alkalies. The choice of alkali depends entirely upon the use for which the casein plastic is intended. The degree of alkalinity induced will also depend upon the intended use of the product. Casein will dissolve at a pH as low as 5.5 although for most uses a pH of 6.5 to 7.0 is desirable and, in some cases, even higher concentrations of alkali may be required.

The suspension is ordinarily heated to a temperature of 50–80° C. to expedite completion of solution of the casein. As soon as solution is complete, there is added under slow strong agitation 2.5 to 5.0 parts of diethylene glycol dilevulinate which dissolves and distributes itself throughout the mass.

The solution is now ready for use and can be adapted to any of the usual manufacturing processes in which casein solutions are employed. If desired, other modifying agents, preservatives, fillers, pigments and the like may be added, such as clay, bentonite, titanium dioxide, wood flour or the like in amounts, for example, of 10 to 70%, based on solids content. The finished products thus obtained show improved resistance to the effects of low relative humidity, retaining a greater degree of flexibility than unmodified casein when exposed for extended periods of time.

Instead of the diethylene glycol dilevulinate in the foregoing example it is also permissible to use triethylene glycol monolevulinate, trimethylene glycol dilevulinate or other members of the series as defined in the specification above.

*Example 2.*—A plastic casein mass is obtained if 100 parts of casein ground to approximately 40 mesh is mixed in a dough mixer or similar equipment with 10 to 40 parts of water and 2.5 to 10 parts of glyceryl dilevulinate. The water and levulinic ester are absorbed by the casein which remains in discrete particles of a rubber-like character.

The resultant mass is suitable for use in the usual manufacturing operations in which it may be molded or extruded under heat and pressure into rods, sheets or shaped articles. These may be hardened by after-treatment with formaldehyde, tannic acid, alum or other "tanning" agents in the usual manner. The resultant products show improved resistance to the effects of prolonged exposure at low relative humidity.

Instead of the glyceryl dilevulinate, glycol dilevulinate, mannitol trilevulinate or other members of series defined above may be used.

In either of the foregoing examples, casein from milk or from soya beans, or other source, may be employed. The methods of preparing these caseins are conventional and need not be described. Solutions of casein so prepared may be applied as coatings to wood, metal, or the like by spraying, brushing or other methods.

If pigments are to be added, they may be of any suitable type which does not unduly and deleteriously affect the properties of the casein into which they are introduced. Common clays, bentonite, titanium dioxide, and such-like materials are suitable for the purpose. They, of course, may be employed over a very broad range extending from substantially zero up to 70 or 80 per cent, dependent upon the use to be made of the casein.

Wood pulps and flours, and other suitable fillers may be incorporated in amounts, for example of 45 to 80 per cent, into solutions of casein, in order to form molding powders which can then be formed by heat above that of softening of casein and pressure into various objects in accordance with conventional methods of molding.

The casein containing levulinic esters may also be employed as a sizing agent or coating agent for paper. In event that it is employed as a size, a solution of the casein is introduced into the pulp upon a paper machine. Coagulants, such as alum, or the like, may also be introduced into the watery pulp in order to effect coagulation of the casein upon the pulp particles. For purposes of coating paper, a solution of casein with the modifiers incorporated therein, may be spread by spraying, dipping or like methods upon a paper web and then dried by hot calendering or other suitable methods.

Formation of threads of modified casein may be effected by squirting solutions of the casein and levulinic acid ester through spinnerets into a bath of formaldehyde or other hardening agent. The bath may contain levulinic acid ester in order to reduce any leaching effect upon the formed threads.

It will, of course, be apparent that casein solutions modified in accordance with the provisions of the present invention may be employed as adhesives for coating sheets of nitro cellulose, cellulose acetate, or other plastics, for purposes of providing a bond to glass in safety glass. The casein solutions are simply applied to the film, and if desired, also to the glass, and after assembly of the various layers of the composite sheet, they are bonded together by application of heat and pressure by conventional methods.

Sheets and films of modified casein may be passed through a bath of or otherwise contacted with a hardening agent such as water solutions of formaldehyde. They are eminently suitable for wrappings for food products, such as cheese, candies, dried fruits, coffee, tea, cigarettes and other common products. They may be applied directly to the food itself, or may be employed as wrappings over inner wrappings of paper, tin foil, rubber hydrochloride, or any other conventional wrapping material. The films may be made practically odorless and tasteless and do not deleteriously affect the food products with which they contact. The edges of the films may be readily sealed together by application of heat or solvents preliminary to contacting them with each other. In some instances it may be desirable to coat food products either directly or over inner wrappings of paper or the like with solutions of casein rather than with preformed films. Papers or other sheets or films, such as sheets of rubber hydrochloride, regenerated cellulose may be coated with casein modified with levulinic acid esters and employed as wrappings for food products as herein disclosed.

Films and other bodies of casein modified with levulinic acid esters herein disclosed may, also, contain compatible plasticizers and other modifiers. Examples of plasticizers which may be included are glycerol, higher fatty acids, alcohols, oleyl alcohol, stearyl alcohol, triethanol amine and the like. The amounts of such modifiers may vary over a considerable range, for example, from 10 to 100 per cent as based upon the content of levulinic acid ester.

Foils and sheets or coatings of casein, when modified with any one of the foregoing levulinic acid esters, may be coated with nitrocellulose lacquers, varnishes and other coating materials containing a small amount (1 or 2 per cent) of a waxy body such as paraffin, beeswax or the like, as moisture proofing agents. These coatings are dried preferably at a temperature above that of melting of the waxy body. The resultant product has a high degree of resistance to moisture permeating.

The forms of the invention herein disclosed are to be considered merely as representative. Numerous modifications may be made therein without departure from the spirit of the invention or the scope of the appended claims.

What we claim is:

1. A composition of matter comprising casein and a glycerol ester of levulinic acid.
2. Casein containing a substantial amount of a modifier comprising a water soluble dihydroxy alcohol ester of levulinic acid.
3. Casein containing a substantial amount of diethylene glycol ester of levulinic acid.
4. A plastic material comprising casein and a substantial amount of a water soluble levulinic acid ester of an ethylene glycol, said glycol containing at least two ethylene groups joined together by an oxygen linkage.
5. A casein plastic comprising casein admixed with 2.5 to 10 percent on the basis of casein content of a water soluble levulinic acid ester of an alcohol containing at least two hydroxy groups.
6. A composition of matter comprising casein containing a water soluble levulinic acid ester of an alcohol containing at least two hydroxy groups, the casein having been treated with a hardening agent to render it water resistant.
7. A composition comprising casein and a levulinic acid ester of trimethylene glycol.
8. A composition of matter comprising casein and a levulinic acid ester of triethylene glycol.

FREDERICK W. ADAMS.
WILLIAM H. LYCAN.